2 Sheets—Sheet 1.
F. B. BROWNELL.
STREET CAR.
No. 11,289. Reissued Nov. 29, 1892.
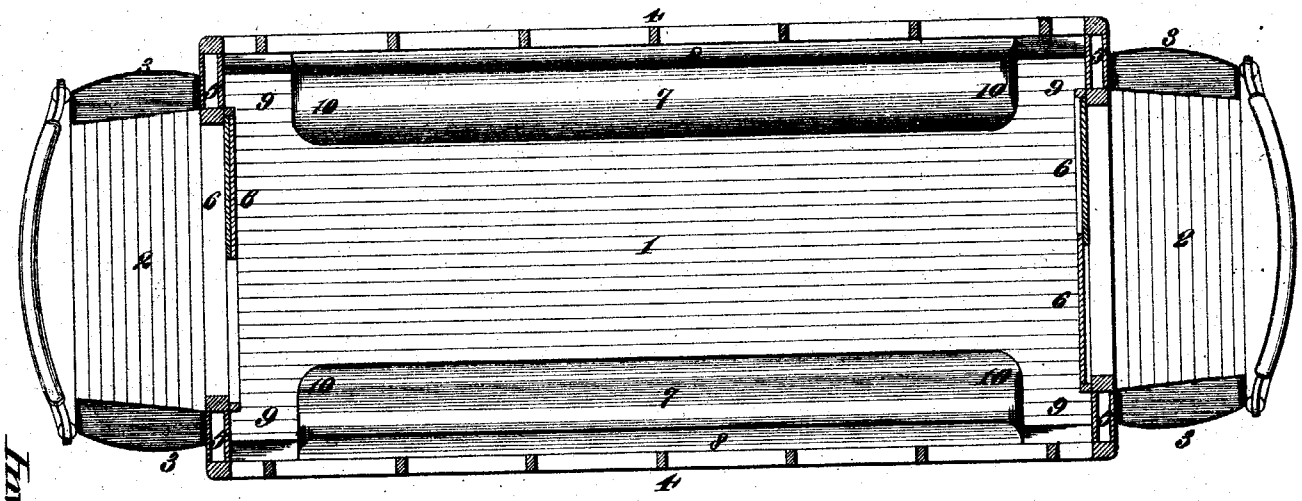
Fig. I.
Attest:
Walter E. Allen.
G. E. Crouse.
Inventor:
F. B. Brownell
By Knight Bros
Attys 2 Sheets—Sheet 2.
F. B. BROWNELL.
STREET CAR.
No. 11,289. Reissued Nov. 29, 1892.
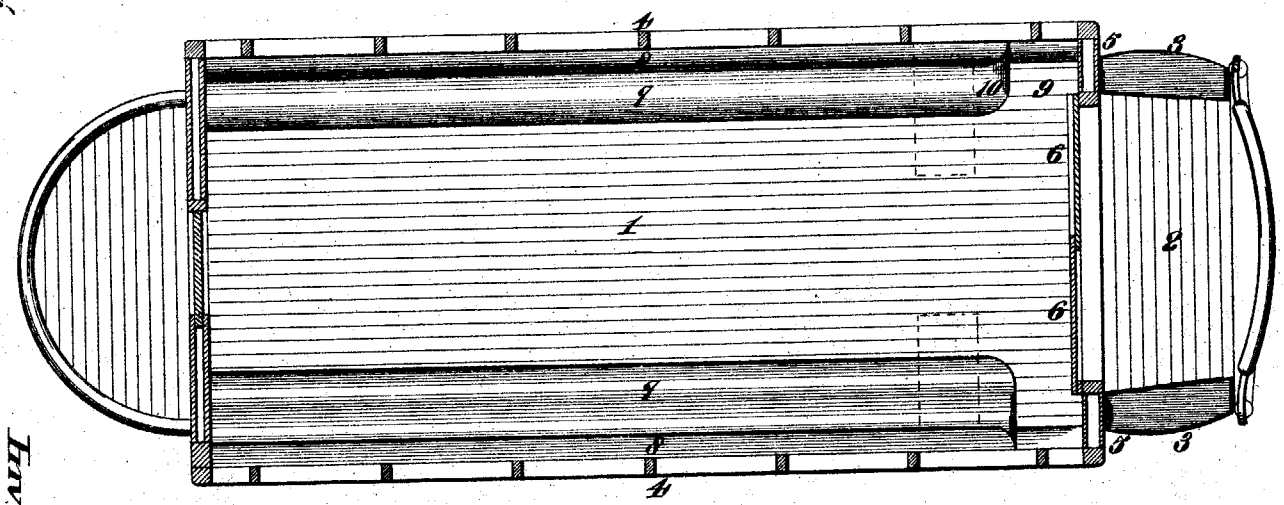
Fig. II.
Attest;
Walter E. Allen
G. E. Crane.
Inventor:
F. B. Brownell
By Knight Bros
Attys

UNITED STATES PATENT OFFICE.

FREDERICK B. BROWNELL, OF ST. LOUIS, MISSOURI.

STREET-CAR.

SPECIFICATION forming part of Reissued Letters Patent No. 11,289, dated November 29, 1892.

Original No. 462,620, dated November 3, 1891. Application for reissue filed September 22, 1892. Serial No. 446,633.

*To all whom it may concern:*

Be it known that I, FREDERICK B. BROWNELL, of the city of St. Louis, in the State of Missouri, have invented a certain new and useful Improvement in Street-Cars, of which the following is a full, clear, and exact description, reference being had to the accompanying drawings, forming part of this specification.

Owing to the increased travel in street-cars and the greater speed of such cars made possible by the use of cables and of electricity as a means of propulsion, it has become necessary to provide for greater freedom of ingress and egress. Heretofore it has been customary to build street-cars with a single sliding door at the middle of each end, with a platform at each end having side step thereto. This form of construction is objectionable because of the tendency of passengers when the seats are filled to stand at or near the doorway both inside the car and on the platforms, so that passengers are often obliged to get off the platforms to allow passengers to pass in or out. Thus frequent delays occur, materially interfering with the speed of transit and causing accidents to persons getting on and off. It has been found necessary on streets having parallel tracks to have some means to prevent passengers getting off or on a car upon the side next to the other track, so as to avoid the danger of passengers being run over by cars on the other track.

My invention relates to improvements that would mitigate, if not entirely remedy, these evils by the described construction and arrangement of doors by providing more room inside the car for passengers and by concentrating that room in space at each end rather than subdivide it into a number of smaller spaces both within the car and upon the platforms. To effect this I propose to have, instead of one door midway of the end, two doors situated each side of the middle of the end, thus being located nearer the steps on each side of the platform. The door upon the side used for ingress and egress may be opened and closed as desired, while the door upon the other side may be fastened in a closed position. The position of the doorway in use so near the edge of the platform would greatly facilitate ingress and egress, as there would be little space upon the platform between the door and the steps, and the main body of people standing within the car would be out of the way of the passenger getting on or off. To make it practicable for passengers to pass through the doorways located as proposed in cars having seats on each side of the car and facing inward, it will be necessary to make the seat shorter than the inside of the car, leaving a space between the ends of the seat and end walls of the car sufficient to allow a person to pass freely in and out through the doorway. With this arrangement a greater number of standing passengers may be carried and with less inconvenience to and from persons passing in and out. The open or movable door would indicate clearly to passengers passing out the direction to be taken.

In the drawings, Figure I is a horizontal section of a car having doors and platforms for passengers at both ends. Fig. II is a similar section having doors and platform for passengers at the rear end only.

The double-ended car shown in Fig. I will be first described.

1 is the floor of the car; 2, the platforms; 3, the steps, and 4 the sides of the car. These may all have the usual or any suitable construction.

5 are the ends of the car, having each two sliding doors 6, adapted to slide beside each other, so that either may be opened; but they cannot both be fully open at the same time. It is intended that the one which is temporarily or permanently out of use shall be fastened shut.

7 are the seats, whose backs 8 are at the sides 4 of the car and which thus face each other. The seats do not extend to the end of the car, but between the ends of the seats and the car are spaces 9, giving easy access to the doorway that may be in use upon one side and standing room upon the other side. The corners 10 of the seats should be curved, so that they will not cause any injury to person or clothing.

In the car shown in Fig. II the passenger ingress and egress is only at the rear end, and this end is constructed in the same manner as the ends of the car shown in Fig. I. The fore end of the car may have the usual construction.

I have described the doors 6 as adapted to slide side by side, and this is my preferred construction, as it is obvious that the doors may be wider and set nearer the sides of the car in such case; but I do not desire to make this construction essential, as the doors may be made to open by sliding outwardly.

The improvement, as far as relates to the two doors 6, may be applied to a car having a row of transverse seats upon each side by setting the end seats farther from the ends of the car. (See dotted lines in Fig. II.)

I claim as new and of my invention—

1. A street-car having at the end two sliding doors, each opening from its side of the car toward the other door and each adapted to provide means of ingress and egress at the side of the platform from which it is moved, thereby providing for the passengers getting on and off the platform at the side adjacent to the open door, substantially as set forth.

2. The combination, in a street-car having a platform and two sliding doors at the end for ingress and egress of passengers, of the seats extending endwise along the sides of the car and having ends at a distance from the ends of the car-body, leaving spaces 9 between the seats and doors, substantially as and for the purposes set forth.

3. The combination, in a street-car having an end platform, of two doors 6 at the end, sliding side by side, and seats 7, extending endwise in the car and shorter than the inside length of the car, substantially as and for the purpose set forth.

4. The combination, in a street-car, of two doors 6 at one end of the car, the platform 2, and seats extending endwise along the sides of the car and having rounded ends at a distance from the ends of the car-body, leaving spaces 9 for the passage of passengers, substantially as set forth.

FREDERICK B. BROWNELL.

In presence of—

ALBERT M. EBERSOLE,
ED. S. KNIGHT.